United States Patent [19]
Falk et al.

[11] Patent Number: 5,564,587
[45] Date of Patent: Oct. 15, 1996

[54] PRESSURE CONTAINER

[76] Inventors: Ingemar Falk, Tant Gredelins väg 2, S-451 73 Uddevalla; Tomas Carlsson, Klev, S-450 47 Bovallstrand, both of Sweden

[21] Appl. No.: 256,041
[22] PCT Filed: Dec. 22, 1992
[86] PCT No.: PCT/SE92/00889
§ 371 Date: Aug. 29, 1994
§ 102(e) Date: Aug. 29, 1994
[87] PCT Pub. No.: WO93/13353
PCT Pub. Date: Jul. 8, 1993

[30] Foreign Application Priority Data

Dec. 23, 1991 [SE] Sweden .................................. 9103825
May 18, 1992 [SE] Sweden .................................. 9201555

[51] Int. Cl.⁶ ...................................................... B65D 1/24
[52] U.S. Cl. .......................... 220/501; 220/506; 220/581
[58] Field of Search ...................................... 220/507, 506, 220/501, 581

[56] References Cited

U.S. PATENT DOCUMENTS 2,802,332  8/1957  Orsino .................................. 220/506 X
3,338,238  8/1967  Warncke ............................... 220/501 X
3,470,929 10/1969  Thornton ............................. 220/506 X
3,837,527  9/1974  Kutik et al. ......................... 220/501 X Primary Examiner—Steven M. Pollard
Attorney, Agent, or Firm—Dvorak and Traub

[57] ABSTRACT

The present invention relates to a pressure vessel (1) comprising at least one intermediate part (4) with an end wall (2, 3) connected to each of its ends (1A, 1B), and longitudinal internally reinforcing walls dividing said intermediate part (4) into fluid-accommodating compartments. The intermediate part (4) with enclosed reinforcing walls consists of an extruded profile with reinforcement and an intermediate part casing integrated with one another, and the respective end walls (2, 3) are capable of attachment by fastening means to the end of the respective intermediate part so that forces arising inside the vessel as a result of the internal overpressure against the respective end wall (2, 3) are distributed so that they act axially in the intermediate part (4), both in its outer casing and internal reinforcement.

The invention also relates to a method for the manufacture of the pressure vessel in accordance with the invention.

20 Claims, 4 Drawing Sheets

PRESSURE CONTAINER

The present invention relates to a pressure vessel comprising at least one intermediate part with an end wall connected to each of its ends, and longitudinal internally reinforcing walls dividing said intermediate part into fluid-accommodating compartments.

Pressure vessels of the kind indicated above have previously been manufactured in such a way that the maximum permissible internal pressure for the vessels has been determined in practice by the wall thickness of the vessel in question. It may be mentioned by way of example that compressed air apparatus, for example consisting of a face mask with a breathing valve and a vessel pack with a regulator unit, for example as illustrated in FIG. 1, is often of a specific size as regards the vessel pack. It is consequently difficult to make a single size fit a large number of people of varying heights and physical builds. Because the vessel pack consists of a number of pressure vessels made of metal, it is heavy, when filled with air or some other breathing gas, for firefighters equipped with smoke respirators or divers, etc., to carry around on the back with other equipment. Similar problems are, of course, encountered with other types of pressure vessel or gas vessels intended for air or oxygen, etc., for example for use by the rescue and emergency services, or for industrial gases. The negative effect of the relatively high own weight of the vessels is emphasized all the more in that an increasing number of pressure vessels is being incorporated into some form of transport system, where the transported weight is directly associated with a cost.

The manufacture of pressure vessels of the air pressure tank type or similar at the present time involves the forming of a tube or a tube-like space with flat or dished end walls. In a design of this kind, as in all pressurized tubes without any internal reinforcement of the vessels, the tensile stresses acting peripherally around a cross-section of the tube section are at least twice as high as the tensile stresses axially in the cross-section.

This means that the material in the tube walls is utilized to less than half its capacity in the axial sense because the design of the construction concentrates the load peripherally. If the design can be modified so that an optimized balance is achieved between axial and peripheral stresses, a material with only half the strength can be used. Alternatively, vessels with half the material content, and thus half the weight, can be made.

The quantities "half" and 50% used in the above description are simplified illustrations. A detailed calculation will produce the actual values for each individual application of the present design.

The technique of reinforcing underground waste pipes and the like internally by the use of partition walls in the longitudinal sense of the pipe is known and used today. These partition walls serve only as a support for the outer casing in order to counteract local collapse under external pressure. The partition walls are also able to act as a means of protecting against fracture when lifting long pipes. See SE-B-340.729.

A further fact of which we are aware today is that the forming of a vessel, which is manufactured in an irregular shape by extrusion, as a container with a number of internal compartments is able to counteract any attempt by the vessel to adopt a circular cross-section in the presence of internal overpressure. See SE-C-224.159.

Vessels with internal compartments are also known to exhibit a more rigid cross-section, which produces a more impact-resistant vessel and less risk of local bulging, for example for spray bottles made of plastics material. See U.S. Pat. No. 3,837,527.

Hoops, wires or similar reinforcing elements have also been wound round the long outer surface of the vessels in question in an effort to reinforce the outer surface of the vessel. This does not produce any change in the stress distribution in the vessels, however, but only in their radial reinforcement.

The principal object of the present invention is thus, in the first place, to find a design of vessel of the indicated kind enabling the characteristics of the material to be utilized in an optimal fashion in the manufacture of vessels for pressurized fluids, and to make available a pressure vessel of the kind referred to above, in which the stated problems no longer exist or have at least been considerably reduced.

Said object is achieved by means of a pressure vessel in accordance with the present invention, which is characterized essentially in that the intermediate part with its internal reinforcing walls consists of an extruded profile with the reinforcement and the casing of the intermediate part integrated with one another, and in that the respective end walls are capable of being attached by means of fasteners to the respective ends of the intermediate part, so that forces arising in the vessel as a result of the internal overpressure against the respective end walls are distributed so as to act axially on the intermediate part, on both its outer casing and internal reinforcement.

According to the invention the pressure vessel is formed in a manner contrary to that previously used for forming such pressure vessels, i.e. it is now possible to make the casing walls thinner, instead of reinforcing them.

The practical function has been demonstrated by pressure-testing parts of the vessel and by detailed calculations according to the finite element method. The tests and the detailed calculations were necessary because the function is contradicted by established methods of calculation which are applied in a generally simplified fashion.

A further object of the present invention is to permit the simple and rational manufacture of pressure vessels comprising at least one intermediate part with an end wall attached to each of its ends, and longitudinal internally reinforcing walls dividing said intermediate part into fluid-accommodating compartments.

Said further object is achieved by a method of the kind intended in accordance with the present invention, which is characterized essentially in that an extruded intermediate part profile comprising reinforcing walls enclosed by, and thus integrated with a surrounding casing is attached to an end wall at the respective ends of the intermediate part by fastening means in such a way that forces arising inside the vessel as a result of the internal overpressure against the respective end wall are distributed so that they act axially in the direction of the end walls both in the vessel casing and in the internal reinforcement.

A vessel in which the strength characteristics of the material can be utilized optimally is achieved by attaching in the manner indicated by the Patent Claims an end wall to each end of, for example, an extruded tube of essentially identical cross-section over its entire length, so that the whole or a major proportion of the cross-section of the tube with its internal reinforcements is utilized for the purpose of transmitting tensile stresses arising as a result of the forces exerted by the internal overpressure against said end walls. The design can be realized practically in accordance with the invention inter alia in any of the ways described below in the illustrative embodiments. The method of construction which determines the function and is proposed along with the invention is to attach end walls to an internally reinforced profile, for example a tube, in such a way that the force of the internal pressure against said end walls is transmitted as a tensile stress axially in the longitudinal sense of the vessel and is distributed over the whole or a major proportion of the cross-section of the tube including its reinforcements.

A pressure vessel in accordance with the present invention may also be designed with the end walls attached respectively both to the casing of the intermediate part and to the internal reinforcement, so that any axial forces which arise in said intermediate part are distributed over at least the major proportion of the cross-section of the intermediate part including the internal reinforcement.

A pressure vessel in accordance with the invention may also be designed in such a way that the intermediate part comprises an extruded profile made of a metallic material, preferably aluminium or some other light material.

A pressure vessel in accordance with the invention may also be designed in such a way that the intermediate part has longitudinal wall reinforcements extending between an outer tube and an inner, essentially concentric core forming compartments inside the intermediate part for the purpose of accommodating pressurized fluid.

A pressure vessel in accordance with the invention may also be designed in such a way that the core is formed by an internal tube.

A pressure vessel in accordance with the invention may also be designed in such a way that an end wall consisting of one or more parts is so arranged as to be attached to either end of the tube forming the intermediate part, so that a force-transmitting joint is produced both at the respective ends of the outer tube and at the internal part of the core.

A pressure vessel in accordance with the invention may also be designed in such a way that an end wall is capable of being connected by means of an external threaded coupling and an internal threaded coupling to an intermediate part, with the external threaded coupling acting between the outer peripheral parts of the intermediate part and said end wall, and with the internal threaded coupling acting between the core of the part and the nave part of said end wall.

A pressure vessel in accordance with the invention may also be designed in such a way that fluid-accommodating compartments formed inside the vessel are connected to one another, so that an external connection opening permits communication with all the compartments intended for fluid.

A method in accordance with the present invention for the manufacture of a pressure vessel of the kind in accordance with the invention can in addition be executed in such a way that one said end wall is attached to the casing of the intermediate part and to the internal reinforcement by means of a mechanical connection or, for example, by welding, adhesive bonding or some other appropriate method, so that any axial forces arising in said intermediate part are distributed over at least the major proportion of the cross-section of the intermediate part, including the internal reinforcement.

A method in accordance with the invention can also be executed in such a way that the intermediate part is extruded from a light metallic material such as aluminium or similar, so that the outer casing of the intermediate part and the internal reinforcements of the intermediate part are integrated with one another.

A method in accordance with the invention can also be executed in such a way that the intermediate part is extruded so as to form an inner, essentially concentric core with radial reinforcement walls which connect the core to the outer casing.

A method in accordance with the invention can also be executed in such a way that an intermediate part which exhibits a tube-shaped partition wall is extruded in such a way that it is attached to the radial reinforcement walls.

The invention is described in greater detail below with reference to the accompanying drawings, in which.

Figure 1:
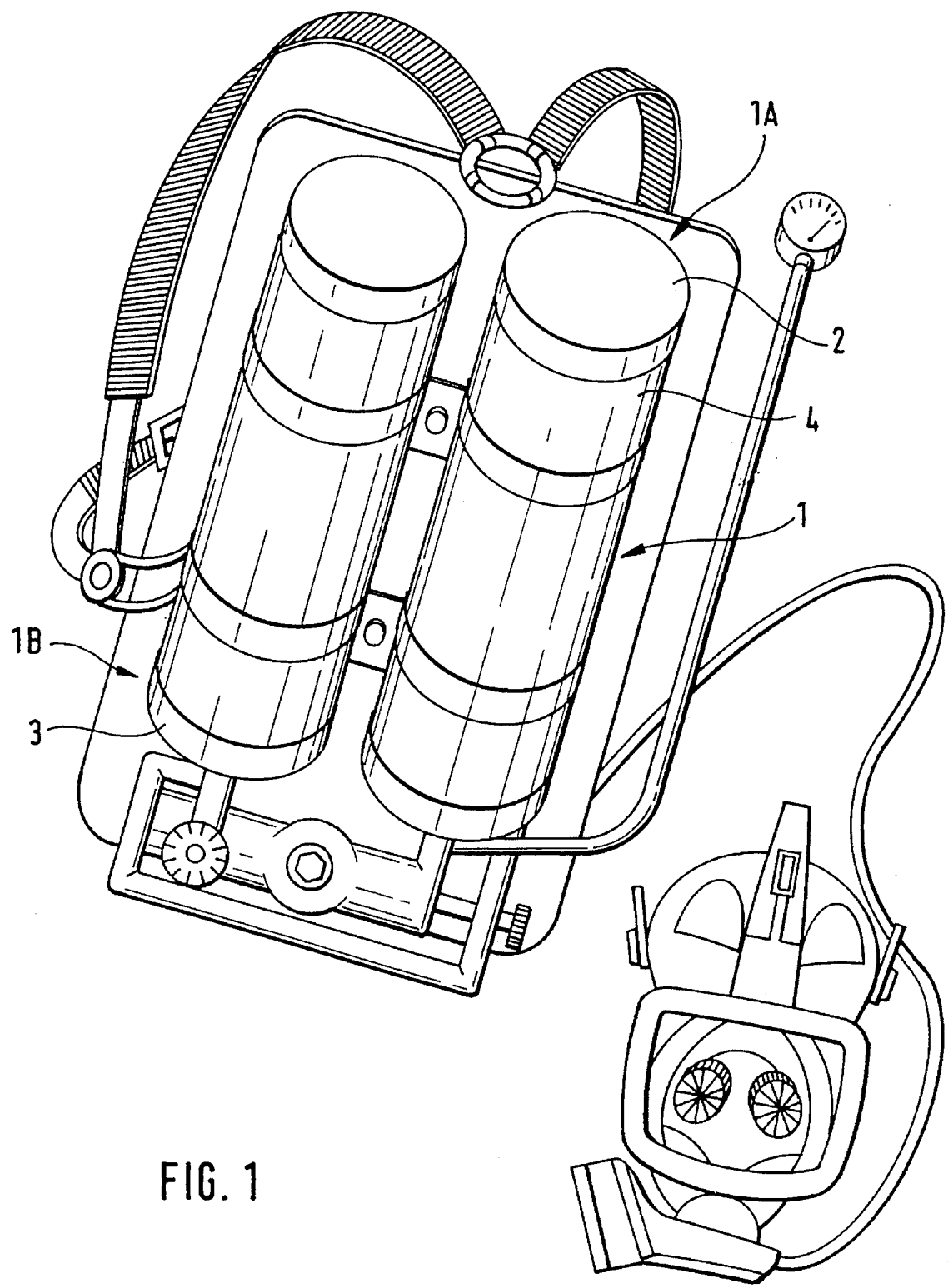
FIG. 1 shows a perspective view of a compressed air apparatus including a pressure vessel in accordance with the invention.
Figure 2:
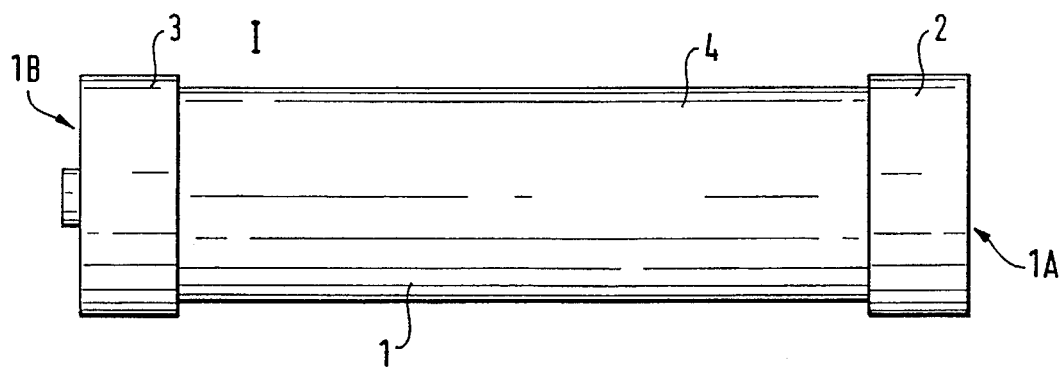
FIG. 2 shows a side view of a pressure vessel in accordance with the invention.
Figure 2A:
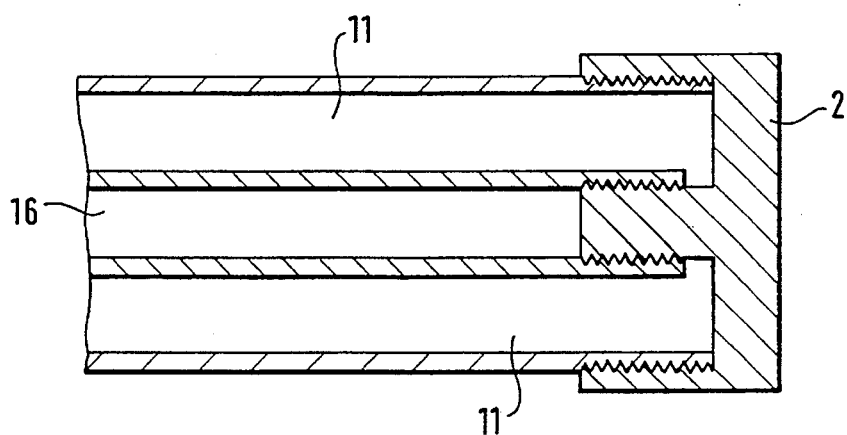
FIG. 2A shows a diagrammatic sectioned view through one end of a pressure vessel.
Figure 3:
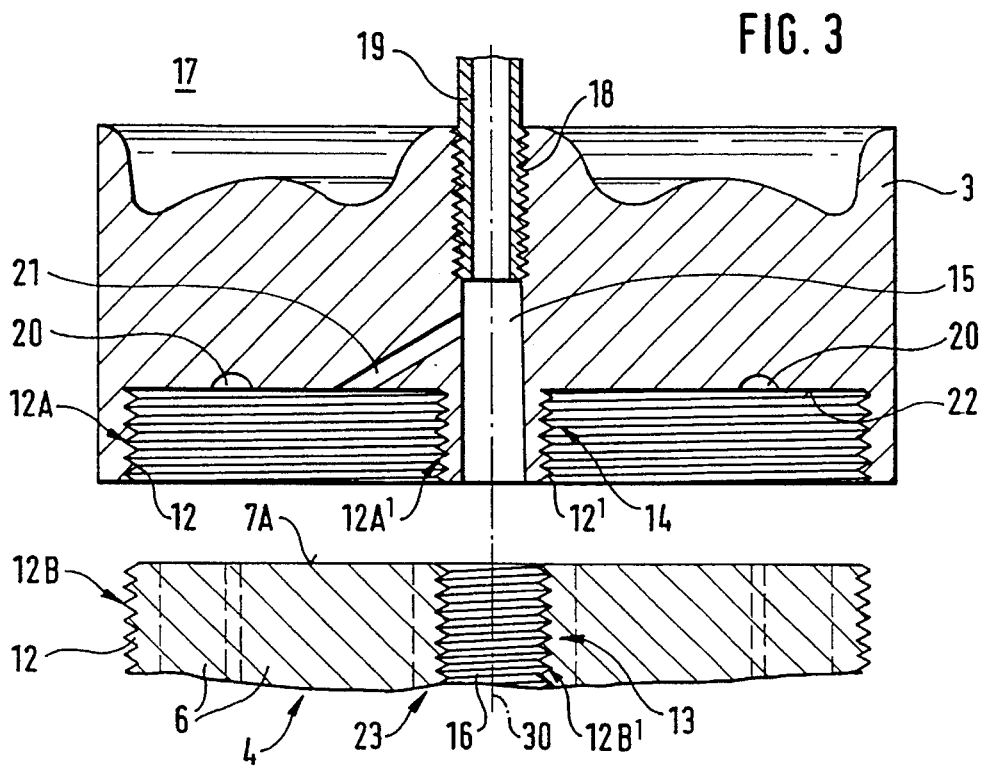
FIG. 3 shows a diagrammatic sectioned view of an end wall capable of attachment to the end of a vessel in a dismantled position.
Figure 4:
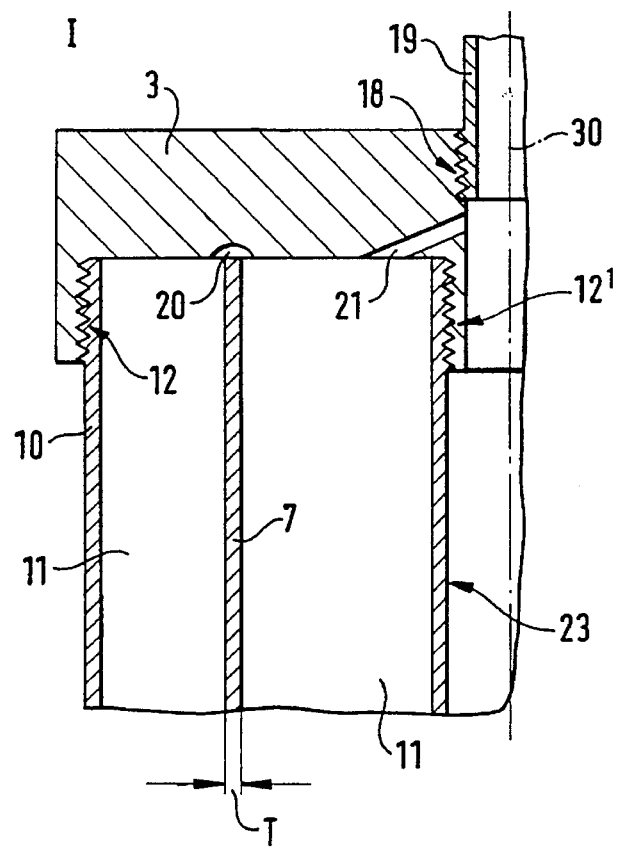
FIG. 4 shows an end wall in the assembled position on a vessel.
Figure 6:
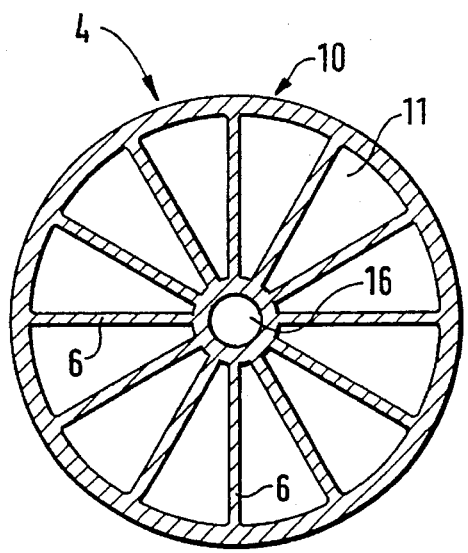
FIGS. 5–6 show sectioned views through a vessel.
Figure 5:
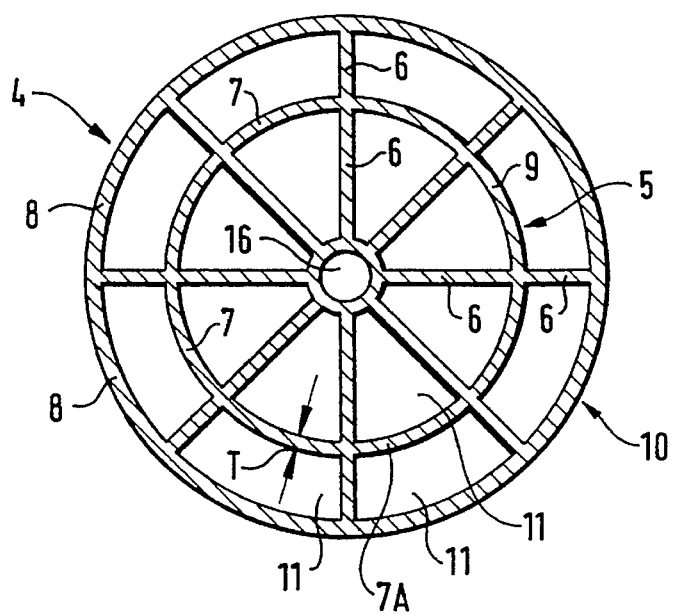
Figure 7:
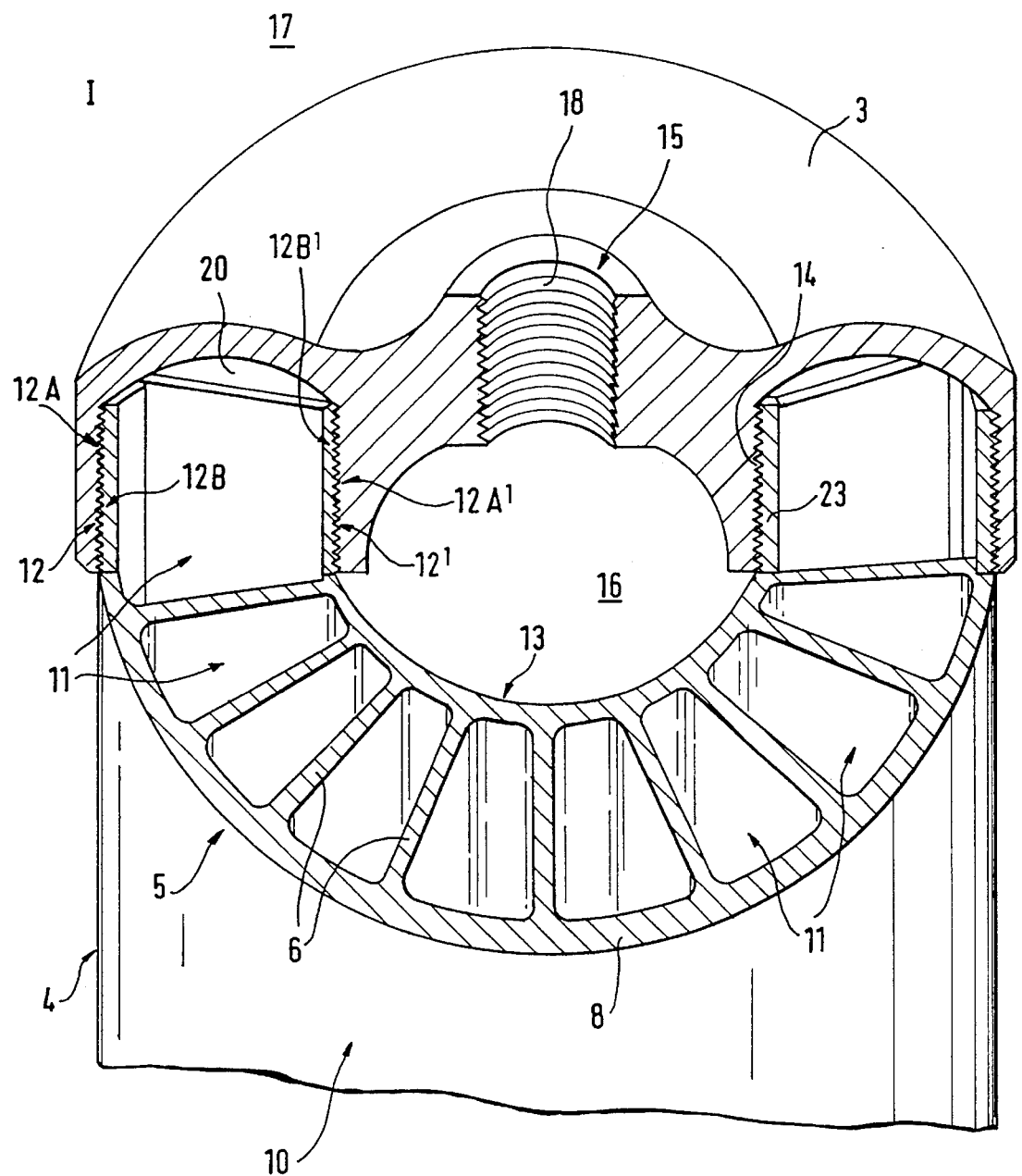
FIG. 7 shows a perspective view of one end of a pressure vessel with one end wall partly sectioned.

An extruded tubular profile piece 4 functioning as an intermediate part and/or end walls 2, 3 exhibit means 5, 6, 7, 8 for reinforcing a pressure vessel 1 internally in both the radial and the axial sense.

Said pressure vessel 1 arranged in accordance with the invention, which consists of end walls 2, 3 situated at mutually opposing ends 1A, 1B of the vessel 1, exhibits means 5 for reinforcing the vessel 1 internally which can be formed by reinforcing walls 6 extending radially internally in the pressure vessel 1, in said tubular profile piece 4 and/or in said end wall 2, 3, and connecting walls 7, 8 preferably also extending along the periphery of the profile piece and/or the end wall. Said connecting walls 7, 8, as their name indicates, connect said radial reinforcing walls 6 to one another.

If said connecting walls 7, 8 extend along the entire periphery of the vessel 1, they will together form a number of concentric tubular partition walls 9 and an outer wall 10.

A pressurized fluid of an appropriate kind, for example a gas or a liquid at a very high pressure of the kind referred to above, can be accommodated before being fed from the vessel 1 in the fluid-accommodating compartments 11 formed in this way, which are bounded laterally and preferably also radially by said walls 610.

According to a first embodiment, the vessel 1 comprises a tubular profile piece 4 and an end wall 2, 3 capable of disconnection at the respective end 1A, 1B and of connection to the profile piece 4.

The end wall attachment can be provided by a gas-tight threaded/screwed connection, welding, adhesive bonding or similar. The end wall attachment to either end of the vessel can be provided in a single piece or in a number of pieces which together assume a function which corresponds to an end wall executed in a single piece. See also the illustrative embodiment.

Also disclosed is the application of end seals to a tube, by so doing obtaining a pressure vessel. The attachment may be performed alternatively by threading or welding to the outer casing of the tube. This method provides the opportunity to vary the length and thus the volume of the vessel, although the whole of the force exerted by the internal pressure against the end wall is transmitted to the casing tube, which must be dimensioned accordingly with a high weight as a result.

The following embodiments are examples of how advantage can be taken of the benefits of the invention through practically executed designs, and of how the disadvantages associated with previously disclosed designs can be overcome.

An internally reinforced extruded tube 4 with reinforcing wings 6 attached to an inner central tube 13 are connected to two end walls 2, 3, one at either end, in such a way that force-transmitting threaded couplings or other jointing methods are applied not only to the outside of the external tube, but also to the inside of the internal tube.

Said respective end walls 2, 3 may be capable of connection by means of gas-tight threaded couplings 12, $12^1$ with a profile piece 4 situated in between, with at least one outer threaded coupling 12 being present on the outer peripheral part of the profile piece 4 and said end wall 2, 3. Internal threads 12A on one part, for example the end wall 3, are able to interact with external threads 12B, for example on the profile piece 4, when the components 2, 3 are screwed together after assembly.

A centrally located threaded coupling $12^1$ or some other suitable coupling arranged between an end wall 3 and a centrally located vessel profile piece 4 may be so arranged that it interacts with a centrally situated nave part, a core 13, 14 of the profile piece 4 or the end wall 3, for example with external threads $12A^1$ on the end wall 3 and internal threads $12B^1$ on the profile piece 4 along its core wall 23.

In the case shown here by way of illustration, the distance for which the end wall attachment extends into the tube in its longitudinal sense must be of an extent and design such as to make it suitable, over the distance along the tube which it covers, to cause a distribution of axial forces inside the tube in its longitudinal sense, both in the outer casing of the tube and in the internal reinforcement components.

At least one of the end walls 2, 3 present is so arranged as to exhibit an opening 15, which discharges from the internal compartments 16 of the profile piece 4 into the surrounding environment 17, in the assembled position I, preferably in the form of a tubular connecting piece 19, which can be attached to the opening 15 for example via a threaded coupling 18.

With a view to enabling said fluid-accommodating compartments 11, 16 to be connected to one another when said end walls 2, 3 are assembled with an intermediate profile piece 4, for example in the manner described above, a coupling 20, 21 is provided between said fluid-accommodating compartments 11, 16, 15 in the profile piece 4, in the end wall 3 and/or in the connecting wall in the profile piece, for example in the form of one or more recesses. For example, an annular groove 20 may be arranged in the internal surface 22 of the end wall in the area directly in line with a connecting wall 7, which groove 20 bridges the thickness T of said wall 7 so that communication between the compartments 11, 16 is permitted in a radial sense between neighbouring compartments 11—11 at the same time as the end parts 7A of the wall 7 are on a level with the internal surface 22 of the end wall in the assembled position I.

One or more channels 21 in the end wall 3 can be present between the central compartment 16, 15 and a radially displaced compartment 11 for the purpose of linking said compartments.

Another possible method of executing designs in accordance with the invention is to introduce plugs fully or partially into both ends of a profile, for example a tube, which plugs may exhibit a form which corresponds to those compartments which are formed between the casing of the profile and the reinforcing elements. Alternatively, the plugs in question, which may be separate from or connected to one another, can be attached to the end termination cross-section of the profile in a manner which permits joining together as described below. The plugs may be welded, adhesive-bonded or attached in some other suitable way to the tube walls, including reinforcements, so that all or the major proportion of the cross-section of the internally reinforced profile is caused to transmit tensile stresses between the two end terminations, the end walls 2, 3, of the vessel formed in this way.

A further advantage, which is achieved through the invention and is not discussed above, is the explosion-proof characteristic. If the vessel were to rupture for whatever reason, not all the contents, for example gas, will leak out at once, but each of the separate subsidiary compartments 11, which extend axially along the vessel 1 about its central axis 31, at least in the intermediate profile piece 4, will then be emptied successively of any pressurized fluid which they may contain as it flows out.

The outer casing may be formed, for example, from an elastic, gas-tight stocking with a flexible seal at the end walls, which seal functions as a means of protection against explosion.

For the purpose of protecting the vessel against external effects, a protective sleeve, for example of an elastic material, can be so arranged as to enclose the vessel, at least around the external surface of the intermediate part. It is possible in this way to protect the vessel from damage such as scratches, etc., which may have a harmful effect on the strength of the vessel.

The method of manufacture for the vessel 1 may be varied within the scope of the previously disclosed technology, although the intermediate piece 4 in particular lends itself to manufacture by extrusion, for example, in lengths which can be cut to the desired length as required and as the occasion arises.

The end walls 2, 3, for example, may be turned, milled, forged, stamped, cast or injection moulded.

The pressure vessel manufactured in this way can be adapted for varying areas of application by the integration in the end pieces of different external supplementary functions or attachments for them. Integrated screwed-on or otherwise connected lifting and handling aids and/or crane and impact protectors, for example, can be applied preferably to the upper end piece. Preferably the lower end piece can similarly be provided with feet, supporting rings or the like. It is also possible for bundling supports and/or stacking supports to be arranged in a similar fashion, for example by executing the outside of the end walls with three or more straight edges. An appropriate number may be six in order to obtain compact and safe stacking.

The object of the invention can be designed in a number of different ways and can also be used for many varying applications apart from those referred to above. The invention is thus not restricted to the examples described above and illustrated in the drawings, but may be varied within the context of the Patent Claims without departing from the idea of invention.

We claim:

1. A pressure vessel comprising at least one intermediate part having a first and a second end and formed from a casing, an end wall connected to each respective end of said intermediate part, and a plurality of longitudinally disposed internal reinforcing walls dividing said intermediate part into several fluid-accommodating compartments, wherein the intermediate part and said enclosed longitudinal reinforcing walls are integrally formed with one another, and wherein the said respective end walls are attachable by fastening means to the ends of the said intermediate part so that forces arising inside the vessel as a result of the internal overpressure against the respective end wall are distributed axially through the intermediate part casing and the longitudinal reinforcing walls, said walls extending radially, and at least one of said end walls having external and internal couplings and connected by means of an external threaded coupling and said internal threaded coupling to the intermediate part, with the external threaded coupling connecting the outer peripheral of the intermediate part to said end wall, and the internal threaded coupling connecting a core of said intermediate part with a nave part of said end wall.

2. A pressure vessel in accordance with claim 1, characterized in that the end walls are attached both to the intermediate part casing and to the respective internal reinforcement walls so that any axial forces arising in said intermediate part will be distributed in a substantial portion of the cross-section of the intermediate part, the reinforcement walls.

3. Pressure vessel in accordance with claim 2, characterized in that the intermediate part (4) consists of an extruded profile made of a metallic material, preferably aluminium or some other light material.

4. Pressure vessel in accordance with claim 2, characterized in that the intermediate part (4) has longitudinal wall reinforcements (6) extending between an outer tube (10) and an inner, essentially concentric core (13) forming compartments (11, 16) inside the intermediate part (4) for the purpose of accommodating pressurized fluid.

5. Pressure vessel in accordance with claim 2, characterized in that fluid-accommodating compartments (11, 16) formed inside the vessel (1) are connected to one another, so that an external connection opening (19) permits communication with all the compartments (11, 16) intended for fluid.

6. A pressure vessel in accordance with claim 1, characterized in that the intermediate part consists of an extruded profile made of a light metallic material.

7. Pressure vessel in accordance with claim 6, characterized in that the intermediate part (4) has longitudinal wall reinforcements (6) extending between an outer tube (10) and an inner, essentially concentric core (13) forming compartments (11, 16) inside the intermediate part (4) for the purpose of accommodating pressurized fluid.

8. Pressure vessel in accordance with claim 6, characterized in that fluid-accommodating compartments (11, 16) formed inside the vessel (1) are connected to one another, so that an external connection opening (19) permits communication with all the compartments (11, 16) intended for fluid.

9. A pressure vessel in accordance with claim 1, characterized in that the longitudinal wall reinforcements extend between said casing and an inner, concentric core, thereby forming compartments inside the intermediate part for the purpose of accommodating pressurized fluid.

10. Pressure vessel in accordance with claim 9, characterized in that fluid-accommodating compartments (11, 16) formed inside the vessel (1) are connected to one another, so that an external connection opening (19) permits communication with all the compartments (11, 16) intended for fluid.

11. A pressure vessel in accordance with claim 9, characterized in that the concentric core is formed by an internal tube.

12. Pressure vessel in accordance with claim 11, characterized in that an end wall (2, 3) consisting of one or more parts is so arranged as to be attached to either end (1A, 1B) of the tube (4) forming the intermediate part, so that a force-transmitting joint is produced both at the respective ends of the outer tube and at the internal part of core.

13. Pressure vessel in accordance with claim 11, characterized in that fluid-accommodating compartments (11, 16) formed inside the vessel (1) are connected to one another, so that an external connection opening (19) permits communication with all the compartments (11, 16) intended for fluid.

14. A pressure vessel in accordance with claim 9, characterized in that an end wall attached to either end of the intermediate part forms a force-transmitting joint at the respective ends of the outer tube and at the internal part of the core.

15. Pressure vessel in accordance with claim 14, characterized in that fluid-accommodating compartments (11, 16) formed inside the vessel (1) are connected to one another, so that an external connection opening (19) permits communication with all the compartments (11, 16) intended for fluid.

16. A pressure vessel in accordance with claim 1, characterized in that fluid-accommodating compartments formed inside the vessel are connected to one another, so that an external connection opening through one of said end walls permits fluid communication with all the compartments intended for fluid.

17. A method for the manufacture of a pressure vessel having at least one intermediate part with a pair of ends, an end wall attached to each of said ends, and a plurality of radially extending longitudinal reinforcing walls dividing said intermediate part interior into fluid-accommodating compartments, in accordance with patent claim 1, characterized in that an extruded intermediate part said reinforcing walls integrally formed to said casing and wherein said end walls of the intermediate part are attached to said casing by fastening means that forces arising inside the vessel as a result of the internal overpressure against the respective end wall are distributed axially in both the vessel casing and in the internal reinforcing walls and that one said end wall having external and internal threaded couplings is attached to the casing of the intermediate part by means of said external threaded coupling and to the internal reinforcing walls by said internal threaded coupling, so that any axial forces arising in said intermediate part are distributed over at least a substantial portion of the intermediate part, including the internal reinforcing walls.

18. The method in accordance with the claim 7, characterized in that the intermediate part is an extruded light metallic material so that the outer casing of the intermediate part and the internal reinforcing walls of the intermediate part are integrally formed with one another.

19. The method in accordance with claim 18, characterized in that the intermediate part is extruded so as to form an inner, essentially concentric core with radial extending reinforcing walls that connect the core to the outer casing.

20. The method in accordance with claim 18, characterized in that an intermediate part is extruded, wherein a tubular partition wall is formed and is attached to the radial extending reinforcing walls.

* * * * *